(12) United States Patent
Addesso et al.

(10) Patent No.: US 8,232,510 B2
(45) Date of Patent: Jul. 31, 2012

(54) GRILLING DEVICE FOR PROPERLY AND UNIFORMLY COOKING FOODSTUFFS

(75) Inventors: Kevin Michael Addesso, Sheboygan, WI (US); Hong Ji, Woodbury, MN (US); Shelly Ann Stayer, Fond du Lac, WI (US)

(73) Assignee: Johnsonville Sausage, Inc., Sheboygan Falls, WI (US)

( * ) Notice: Subject to any disclaimer, the term of this patent is extended or adjusted under 35 U.S.C. 154(b) by 551 days.

(21) Appl. No.: 12/559,288

(22) Filed: Sep. 14, 2009

(65) Prior Publication Data

US 2011/0062141 A1    Mar. 17, 2011

(51) Int. Cl.
- F27D 11/00 (2006.01)
- H05B 3/68 (2006.01)
- H05B 1/02 (2006.01)
- H05B 3/06 (2006.01)

(52) U.S. Cl. .......... 219/524; 219/386; 219/448.13; 219/516

(58) Field of Classification Search ........ 219/386, 219/448.13, 516, 524; 99/441
See application file for complete search history.

(56) References Cited

U.S. PATENT DOCUMENTS

| 2,044,615 | A | 6/1936 | Kennedy |
| 2,107,931 | A | 2/1938 | Brown |
| 3,788,209 | A | 1/1974 | Artar et al. |
| 3,948,159 | A | 4/1976 | Vigerstrom |
| 4,119,020 | A | 10/1978 | Sharp et al. |
| 4,392,038 | A | 7/1983 | Day et al. |
| 4,885,989 | A | 12/1989 | Korpan |
| 5,606,905 | A | 3/1997 | Boehm et al. |
| 6,024,081 | A | 2/2000 | Libertini, Jr. |
| 6,269,738 | B1 | 8/2001 | Huang |
| 6,389,959 | B1 | 5/2002 | Robertson |
| 6,389,961 | B1 * | 5/2002 | Wu .................... 99/339 |
| 6,405,642 | B1 | 6/2002 | Morris |
| 6,429,409 | B1 | 8/2002 | Siu |
| 6,595,115 | B1 * | 7/2003 | Lin .................... 99/342 |
| 6,758,132 | B1 | 7/2004 | Kuo et al. |
| 6,860,191 | B2 | 3/2005 | Jackson et al. |
| 7,053,337 | B2 | 5/2006 | Ragan et al. |
| 7,339,137 | B1 | 3/2008 | Sorenson et al. |
| 2001/0018868 | A1 * | 9/2001 | Brady .................... 99/332 |

* cited by examiner

Primary Examiner — Mohsen Ahmadi
(74) Attorney, Agent, or Firm — Quarles & Brady LLP

(57) ABSTRACT

A cooking device comprises a base and a heating element supported by the base. A cooking plate is heated by the heating element and includes at least a first cavity for receiving an item being cooked. At least a first temperature probe is disposed in the first cavity for piercing the item being cooked.

5 Claims, 4 Drawing Sheets

GRILLING DEVICE FOR PROPERLY AND UNIFORMLY COOKING FOODSTUFFS

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The present invention relates to cooking devices, particularly grilling devices for cooking sausage-like foodstuffs.

BACKGROUND OF THE INVENTION

Countertop grills are well-known devices for cooking foodstuffs in a similar manner to conventional outdoor gas and charcoal grills. However, countertop grills are typically powered by an electrical source (e.g., a 120V outlet) and are much smaller than conventional outdoor grills. As such, countertop grills are useful during fall, winter, and spring seasons when inclement weather may cause impractical outdoor grilling conditions. Furthermore, cleaning a conventional outdoor grill is typically more time-consuming than a countertop grill. For example, the grilling rack of a conventional outdoor grill may need to be scraped to remove remaining food particles and the grill may need to be tipped to remove grease after use.

Most countertop grill designs include a frame supporting a lower heating element. The lower heating element heats a lower cooking plate on which foodstuffs are placed during use. The frame pivotally connects to a lid supporting an upper heating element. The upper heating element heats an upper cooking plate that cooks foodstuffs from above during use. That is, the upper and lower cooking plates cook foodstuffs from both above and below during use, thereby providing faster cooking than conventional outdoor grills.

Unfortunately, previous conventional outdoor grill and countertop grill designs are typically more effective for cooking some types of foodstuffs compared to other types. For example, previous designs are highly effective for cooking foodstuffs such as hamburger patties, chicken breasts, and steaks. Conversely, previous grill designs are less effective for cooking sausage-like foodstuffs such as sausages, bratwursts, breakfast links, frankfurters, and the like, due to their shape. The outer surfaces of sausage-like foodstuffs are cooked, and in some cases even burned, by previous grill designs while the centers may be undercooked. Furthermore, it may be difficult to determine if the centers of sausage-like foodstuffs are properly cooked based on the burned appearance of the outer surfaces. A user may cut open sausage-like foodstuffs during grilling to visibly determine if the center is cooked. However, such an action causes sausage-like foodstuffs to release moisture thereby altering the flavor of the cooked product.

Considering the limitations of previous grill designs, it would be desirable to have an improved cooking device that reduces or eliminates one or more of the aforementioned drawbacks of previous designs.

SUMMARY OF THE INVENTION

In one aspect, the present invention provides a cooking device comprising a base and a heating element supported by the base. A cooking plate is heated by the heating element, and the cooking plate includes at least a first cavity for receiving an item being cooked. The cooking device further comprises at least a first temperature probe extending through the cooking plate into the first cavity for piercing the item being cooked.

In another aspect, the cooking device, comprises a base and a heating element supported by the base. The cooking device further comprises a cooking plate heated by the heating element, and the cooking plate includes at least a first cavity for receiving an item being cooked. The first cavity has an arcuate cross sectional shape and an arcuate longitudinal shape.

In yet another aspect, the cooking device comprises a base and a lower heating element supported within the base. The cooking device further comprises a lower cooking plate heated by the lower heating element, and the lower cooking plate has at least a first arcuate cavity. A cover pivotally connects to the base, and the cover is movable between an open position spaced apart from the base and a closed position proximate the base. An upper heating element is supported within the cover, and an upper cooking plate is heated by the upper heating element. The upper cooking plate has at least a second arcuate cavity aligned with the first arcuate cavity, and in the closed position the first arcuate cavity and the second arcuate cavity define a cooking chamber for receiving an item being cooked. The cooking device further comprises at least a first temperature probe disposed in the cooking chamber.

The foregoing and advantages of the invention will appear from the following description. In the description, reference is made to the accompanying drawings which form a part hereof, and in which there is shown by way of illustration preferred embodiments of the invention. Such embodiments do not necessarily represent the full scope of the invention, however, and reference is made therefore to the claims herein for interpreting the scope of the invention.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

Figure 1:
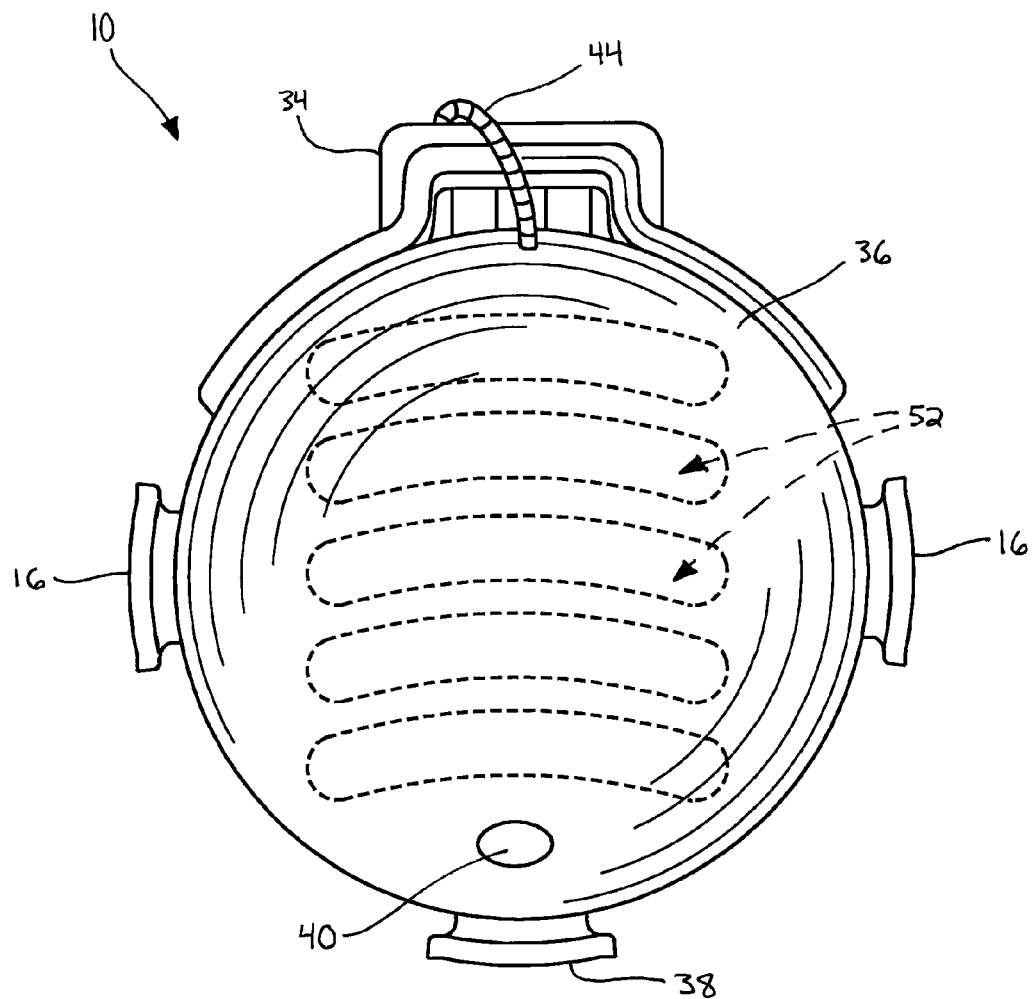
FIG. 1 is a top view of a cooking device according to the present invention.
Figure 2:
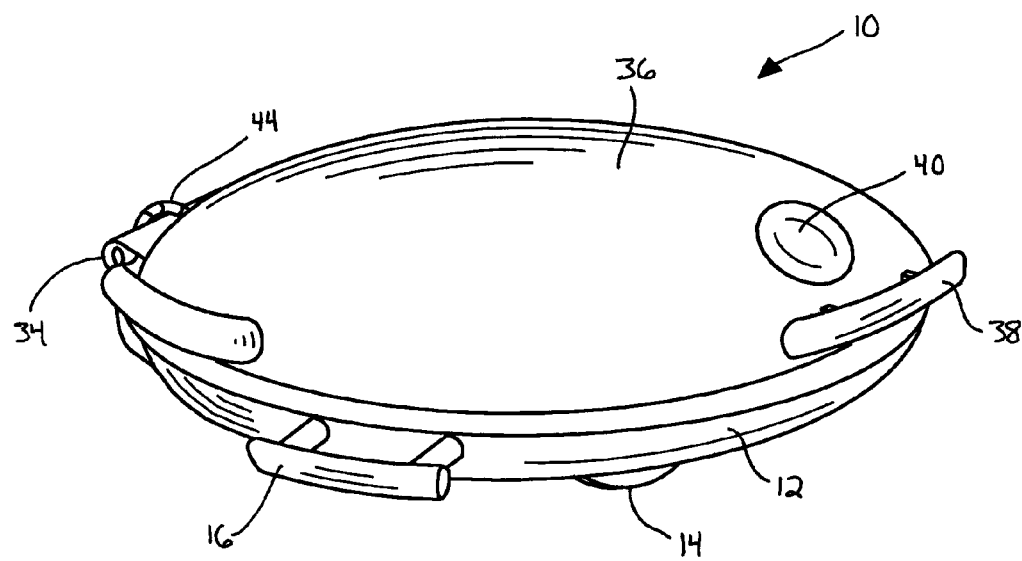
FIG. 2 is a perspective view of the cooking device of FIG. 1 in a closed position.
Figure 3:
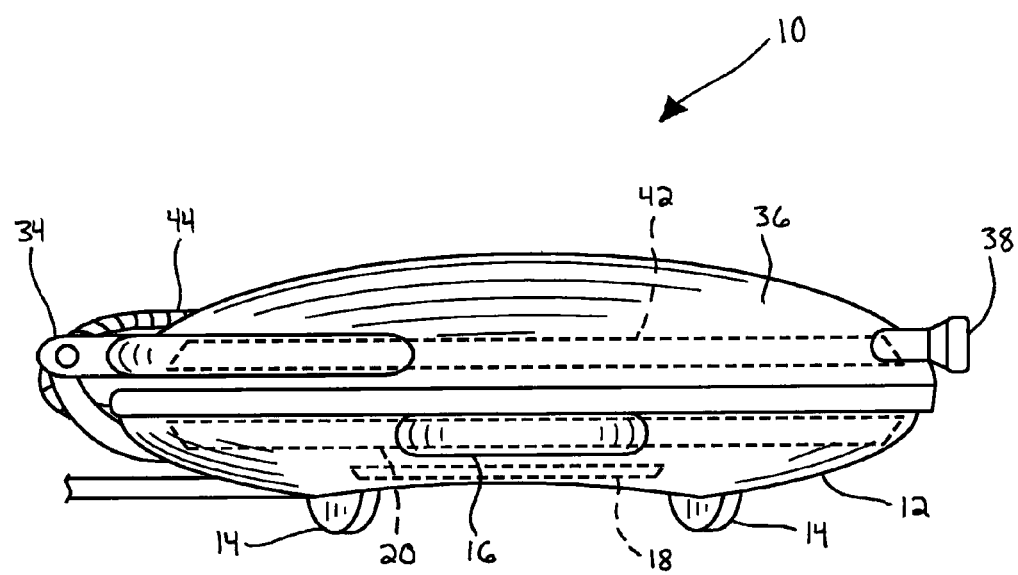
FIG. 3 is a side view of the cooking device of FIG. 1.

Referring to now to FIGS. 1-5, a cooking device or grill 10 according to the present invention includes a base 12 that supports the device on a countertop, tabletop, or other appropriate work surface. The base 12 may be a heat resistant material known in the art. The base 12 includes one or more feet 14 that may also be a heat resistant material to prevent conductive heat transfer from the grill 10 to the work surface. Alternatively, the feet 14 may be a material that provides a high coefficient of friction against the work surface such that the grill 10 does not slide easily. The base 12 also mounts handles 16 on opposite sides such that the grill 10 may be lifted and repositioned by a user.

The base 12 houses a controller or microprocessor 18 that controls operation of the grill 10 as described in further detail below. The microprocessor 18 may be any appropriate design known in the art. The base 12 also houses a lower heating element 20 operatively connected to the microprocessor 18. The lower heating element 20 may be any appropriate design known in the art for heating foodstuffs. Insulation (not shown) may be provided within the base 12, e.g., between the lower heating element 20 and electronic components or the walls of the base 12, to prevent excessive heat transfer away from foodstuffs cooked within the grill 10.

The lower heating element 20 heats a lower cooking plate 22 (FIG. 4) disposed there above. The lower cooking plate 22 is preferably a cast iron component having a Teflon coated upper surface 24. The upper surface 24 includes one or more cavities 26, each of which may support foodstuffs during cooking. Each cavity 26 preferably has a semi-circular cross sectional shape and an arcuate longitudinal shape (i.e., generally matching the shape of the bottom of sausage-like foodstuffs, such as Italian sausages, bratwursts, frankfurters, and the like.). Advantageously, providing an arcuate, rounded cavity 26 surrounds the sausage-like item with the cooking plate material to evenly heat the sausage-like item and prevent overcooking portions of the sausage-like item (e.g., the outer surface) while undercooking other portions (e.g., the center). The cavities 26 may also include projecting ribs 30 that form "grill marks" on sausage-like foodstuffs.

In some embodiments, the lower cooking plate 22 may be releasably connected to the base 12 (e.g., via latching mechanisms, tangs and snap clip connectors, tongue-in-clip connectors, or the like) to permit interchangeability with cooking plates having cavities appropriate for cooking smaller sausage-like foodstuffs (e.g., breakfast links) or other types of foodstuffs (e.g., hamburger patties, chicken breasts, or the like).

One or more narrow, cylindrical temperature probes 32 supported by the base 12 extend through the lower cooking plate 22 and are disposed above one or more of the cavities 26 to piece one or more sausage-like foodstuffs being cooked. The temperature probes 32 may include a sharp tip to facilitate piercing. Preferably, the temperature probes 32 extend midway through a sausage-like foodstuffs being cooked to sense the center temperature of the sausage-like foodstuffs. The temperature probes 32 facilitate proper cooking as described in further detail below.

Figure 4:
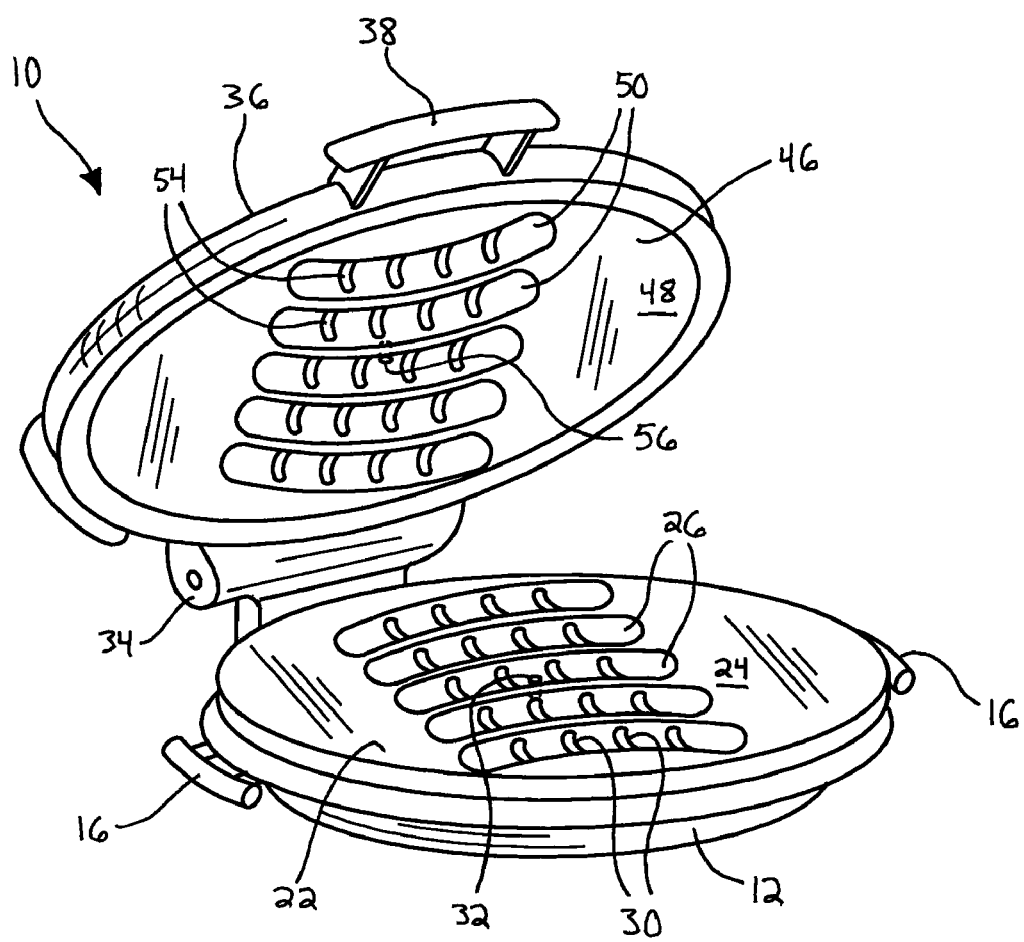
FIG. 4 is a perspective view of the cooking device of FIG. 1 in an open position.
Figure 5:
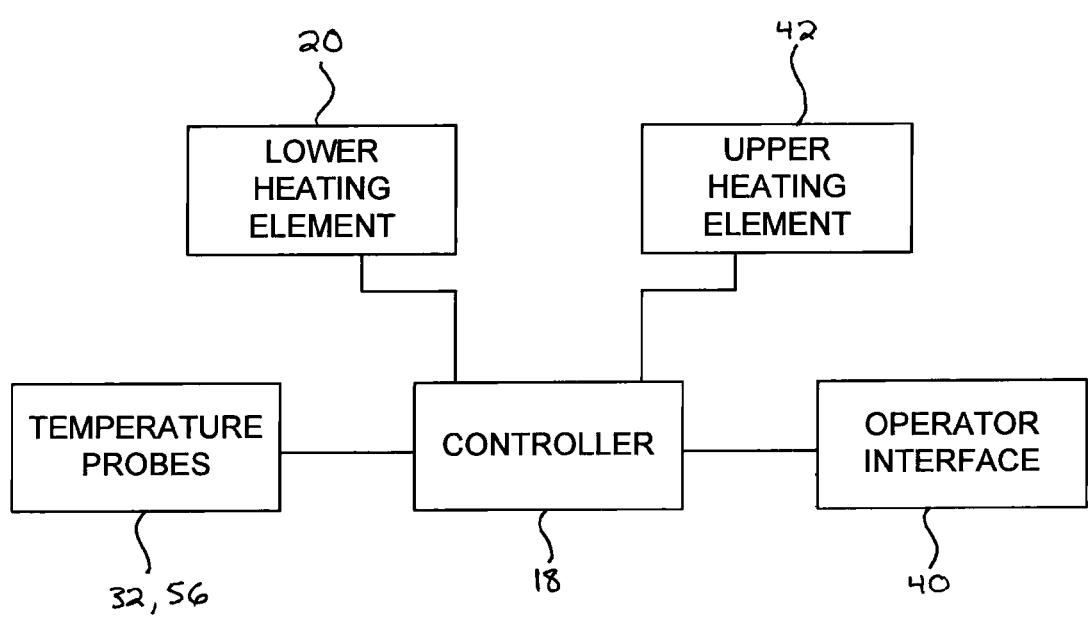
FIG. 5 is a schematic diagram of electrical components of the cooking device of FIG. 1.

The base 12 further includes a hinge 34 for pivotally connecting to a cover 36. In some embodiments, the hinge 34 may be a design known in the art that permits the cover 36 to both translate vertically and pivot relative to the base 12. In any case, the hinge 34 permits the cover 36 to pivot between a closed position (FIGS. 1-3) and an open position (FIG. 4). In the closed position, the cover 36 is positioned proximate the base 12 such that foodstuffs may be cooked within the grill 10. In the open position, the cover 36 is spaced apart from the base 12 such that foodstuffs may be inserted and removed from the grill 10.

The cover 36 may be a heat resistant material known in the art (e.g., the same material as the base 12). The side of the cover 36 opposite the hinge 34 mounts a handle 38 such that a user may easily move the cover 36 between the open and closed positions. The cover 36 also preferably mounts an operator interface 40 that provides information regarding cooked foodstuffs to a grill user. This aspect of the invention is described in further detail below.

The cover 36 houses a upper heating element 42 that also produces heat for cooking foodstuffs within the grill 10. The upper heating element 42 may be any appropriate design known in the art (e.g., similar to that of the lower heating element 20). Furthermore, the upper heating element 42 may operatively connect to the microprocessor 18 and the lower heating element 20 via an electrical cord disposed within an extension spring 44. Insulation (not shown) may be provided within the cover 36, e.g., between the upper heating element 42 and the walls of the cover 36, to prevent excessive heat transfer away from foodstuffs cooked by the grill 10.

The upper heating element 42 heats an upper cooking plate 46 (FIG. 4) disposed there below. The upper cooking plate 46 is preferably a cast iron component having a Teflon coated lower surface 48. The lower surface 48 includes one or more cavities 50, each of which is aligned with one of the lower cavities 26 on the lower cooking plate 22 in the closed position. The cavities 50 generally have the same shape as the lower cavities 26 and face the opposite direction. As such, each set of cavities 26 and 50 defines a cooking chamber 52 having a circular cross sectional shape and an arcuate longitudinal shape (i.e., generally matching the arcuate, rounded shape of sausage-like foodstuffs). The shape of the cooking chambers 52 is effective for properly and uniformly cooking sausage-like foodstuffs. That is, the cooking plates 22 and 46 surround and heat the entire circumference of sausage-like foodstuffs to prevent overcooking some portions of the sausage-like foodstuffs while undercooking other portions. The cavities 50 may also include projecting ribs 54 that form "grill marks" on sausage-like foodstuffs.

In some embodiments, the upper cooking plate 46 may be releasably connected to the cover 36 (e.g., via latching mechanisms, tangs and snap clip connectors, tongue-in-clip connectors, or the like) to permit interchangeability with cooking plates having cavities appropriate for cooking smaller sausage-like foodstuffs (e.g., breakfast links) or other types of foodstuffs (e.g., hamburger patties, chicken breasts, or the like).

One or more narrow, cylindrical temperature probes 56 supported by the cover 36 extend through the upper cooking plate 46 and are disposed above one or more of the cavities 50 (i.e., within the cooking chambers 52) to pierce one or more sausage-like foodstuffs being cooked. The temperature probes 56 may include a sharp tip to facilitate piercing. Preferably, the temperature probes 56 extend midway through a sausage-like foodstuffs being cooked to sense the center temperature of the sausage-like foodstuffs.

The microprocessor 18 may supply electricity to the heating elements 20 and 42, and thereby control cooking, in several different manners. For example, the microprocessor 18 may simply energize the heating elements 20 and 42 until the temperature probes 32 and 56 sense a sufficient internal temperature within the cooked foodstuffs (e.g., 160° F. for sausages). As another example, the temperature sensed by the temperature probes 32 and 56 may be used by the microprocessor 18 to determine the level to which foodstuffs have been cooked (e.g., rare, medium rare, medium, and so forth). Such information may then be displayed on the operator interface 40. Similarly, the operator interface 40 may receive user input (e.g., via a keypad or touch-sensitive display) regarding a desired cooking level for foodstuffs. In these embodiments, the microprocessor 18 may de-energize the heating elements 20 and 42 after the internal temperature of the cooked foodstuffs reaches a value corresponding to the desired cooking level.

As yet another example, the operator interface 40 may receive user input regarding the type of foodstuffs being cooked and a desired cooking level. Such an embodiment may be useful for cooking foodstuffs in which sufficient internal cooking temperatures differ (e.g., chicken and steak are well cooked at about 165° F. and 175° F., respectively). As yet another example and if temperature probes 32 and 56 are positioned in each cooking chamber 52, the operator interface 40 may indicate if individual foodstuffs are sufficiently cooked. Such an embodiment may be useful for simultaneously cooking different types of foodstuffs (e.g., bratwursts and frankfurters).

The structure and operation of the grill 10 may be modified without departing from the scope of the invention. For example, the grill 10 may include one or more temperature probes extending through only one of the lower cooking plate 22 and the upper cooking plate 46. In such embodiments, the temperature probe is preferably an upper temperature probe 56 such that foodstuff juices do not leak downwardly from the hole formed by the probe 56. As another example, the temperature probes 32 and 56 may fixedly connect to the lower cooking plate 22 and the upper cooking plate 46, respectively, and the probes 32 and 56 may operatively connect to the microprocessor 18 by releasable electric leads. As another example, the heating elements 20 and 42 may undergo a "pre-heating" process when power is initially supplied to the grill 10. As yet another example, the grill 10 may cook foodstuffs for a predetermined time period at a predetermined temperature and provide an audible indication when foodstuffs are properly cooked.

While there has been shown and described what is at present considered the preferred embodiment of the invention, it will be obvious to those skilled in the art that various changes and modifications can be made therein without departing from the scope of the invention defined by the appended claims.

We claim:

1. A cooking device, comprising:
   a base;
   an upper heating element supported by said base;
   an upper cooking plate heated by said upper heating element, said upper cooking plate including at least a first cavity having an arcuate cross sectional shape and an arcuate longitudinal shape and for receiving an item being cooked;
   at least a first temperature probe extending through said upper cooking plate into said first cavity for piercing the item being cooked;
   a cover movably connected to said base, wherein said upper heating element is supported within said cover, said upper cooking plate is proximate said upper heating element, and said first temperature probe extends through said upper cooking plate;
   a lower heating element supported within said base;
   a lower cooking plate heated by said lower heating element;
   at least a second temperature probe extending through said lower cooking plate into said second cavity for piercing the item being cooked;
   wherein said cover is movable between an open position spaced apart from said base and a closed position proximate said base, and said lower cooking plate having at least a second cavity aligned with said first cavity in said closed position;
   a microprocessor operatively connected to said heating element to supply power to said heating element, and said microprocessor being operatively connected to said first temperature probe to receive temperature information therefrom; and
   an operator interface operatively connected to said microprocessor for displaying cooking information derived from said temperature information.

2. The cooking device as in claim 1, wherein said first temperature probe is operatively connected with said upper heating element to de-energize said upper heating element upon sensing a predetermined temperature.

3. The cooking device as in claim 1, wherein said first cavity and said second cavity define a cooking chamber in which the item is cooked, and wherein said second temperature probe is disposed in said cooking chamber.

4. A cooking device, comprising:
   a base;
   an upper heating element supported by said base;
   an upper cooking plate heated by said upper heating element, said upper cooking plate including at least a first cavity for receiving an item being cooked, said first cavity having an arcuate cross sectional shape and an arcuate longitudinal shape;
   a cover movably connected to said base, wherein said upper heating element is supported within said cover, and said upper cooking plate is proximate said upper heating element;
   a lower heating element supported within said base;
   a lower cooking plate heated by said lower heating element, said lower cooking plate having at least a second arcuate cavity, said second arcuate cavity having an arcuate cross sectional shape and an arcuate longitudinal shape, in said closed position said first arcuate cavity and said second arcuate cavity being aligned and defining a cooking chamber for receiving the item being cooked; and
   at least a first temperature probe extending through said cooking chamber for piercing the item being cooked.

5. A cooking device, comprising:
   a base;
   a lower heating element supported within said base;
   a lower cooking plate heated by said lower heating element, said lower cooking plate having at least a first arcuate cavity having an arcuate cross sectional shape and an arcuate longitudinal shape and for receiving an item being cooked;
   a cover pivotally connected to said base, said cover being movable between an open position spaced apart from said base and a closed position proximate said base;
   an upper heating element supported within said cover;
   an upper cooking plate heated by said upper heating element, said upper cooking plate having at least a second arcuate cavity aligned with said first arcuate cavity, in said closed position said first arcuate cavity and said second arcuate cavity defining a cooking chamber for receiving an item being cooked;
   at least a first temperature probe extending through said upper cooking plate and disposed in said cooking chamber for piercing the item being cooked;
   a microprocessor operatively connected to said lower heating element and said upper heating element to supply power to said lower heating element and said upper heating element, and said microprocessor being operatively connected to said first temperature probe to receive temperature information therefrom;
   an operator interface operatively connected to said microprocessor for displaying cooking information derived from said temperature information.

* * * * *